United States Patent [19]
Zimber

[11] 3,849,839
[45] Nov. 26, 1974

[54] EASILY ATTACHABLE FASTENER

[76] Inventor: Eric Zimber, 20 Wendell St., Hempstead, N.Y. 11530

[22] Filed: July 2, 1973

[21] Appl. No.: 375,328

[52] U.S. Cl. .................. 24/109, 24/108, 24/221 R
[51] Int. Cl. ............................................. A44b 1/32
[58] Field of Search ............ 24/221 R, 90 A, 101 R, 24/101 T, 106, 109, 73 RM, 40, 108

[56] References Cited
UNITED STATES PATENTS

| | | | |
|---|---|---|---|
| 375,373 | 12/1887 | May | 24/106 |
| 1,303,770 | 5/1919 | Carr | 24/221 R |
| 3,021,583 | 2/1962 | Grannen | 24/109 |
| 3,272,061 | 9/1966 | Seckerson | 24/221 R |
| 3,344,488 | 10/1967 | Texier | 24/221 R |
| 3,407,454 | 10/1968 | Myatt | 24/221 R |
| 3,486,205 | 12/1969 | Smith | 24/221 R |

Primary Examiner—Paul R. Gilliam
Assistant Examiner—Kenneth J. Dorner
Attorney, Agent, or Firm—Hane, Baxley & Spiecens

[57] ABSTRACT

A fastener comprises a pin member and a socket member for receiving the pin member. The members are so contoured that when the pin member is inserted into the socket member in a particular orientation and then rotated by at least a given amount, the pin member is locked into the socket member and is restrained from either axial or rotational movement. However, a forced counter rotation permits the separation of the members.

5 Claims, 9 Drawing Figures

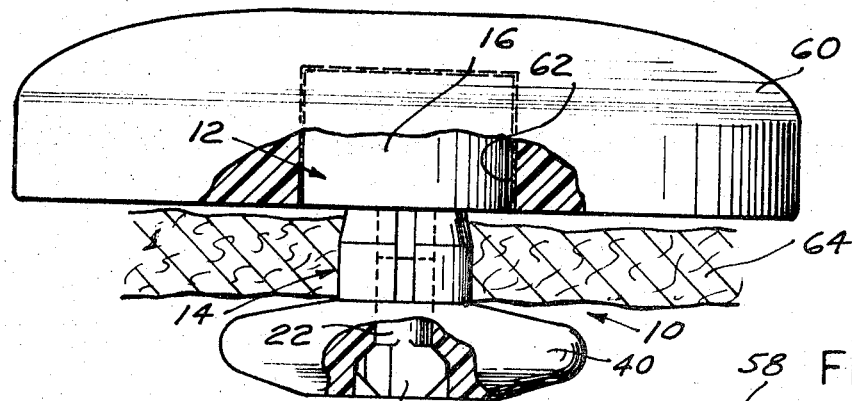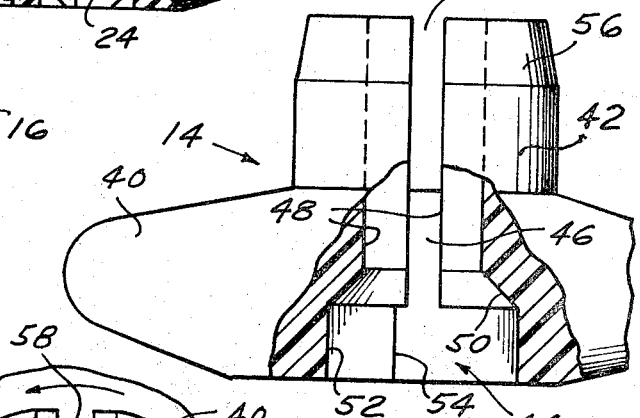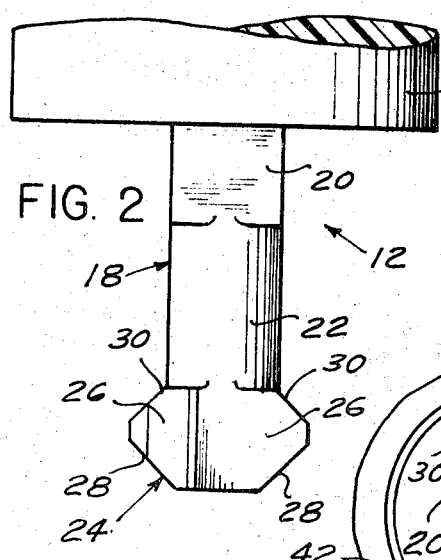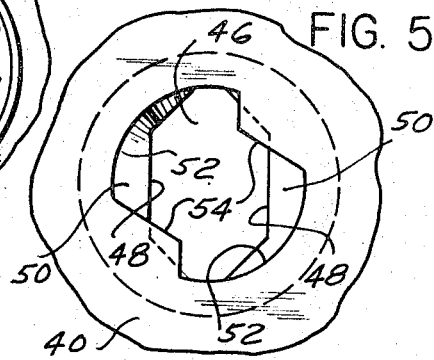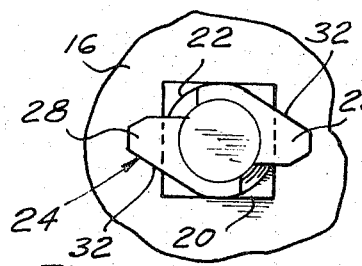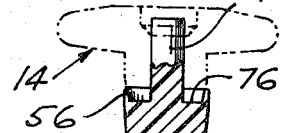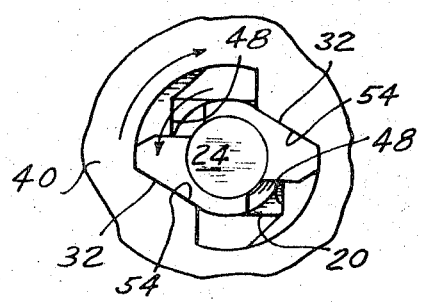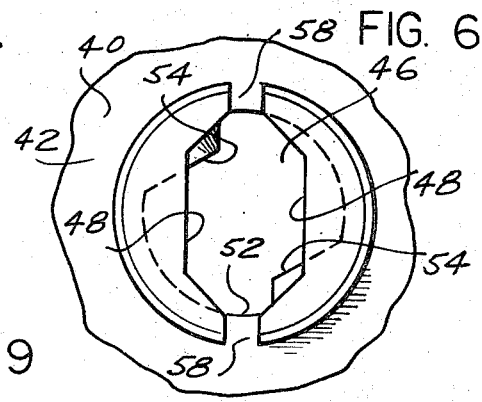

EASILY ATTACHABLE FASTENER

This invention pertains to fasteners and more particularly, to threadless buttons and the like.

There have been many proposals for threadless fasteners. The most popular is now a snap fastener. However, such a fastener does not provide any esthetic design for the exposed portion. Many high fashion buttons must be removed before cleaning and resewn after cleaning. Such a procedure is, at the very least, an inconvenience. A variety which permits esthetic design freedom and easy removability and reattachability comprises a button with a looped shank. After the shank passes through a bound hole in the material a cotter pin is passed through the loop of the shank. This variety requires the binding of a hole in the material. In addition, the cotter pin must be covered by a flap of material or it will snag an adjacent garment.

It is, accordingly, a general object of the invention to provide an improved threadless fastener.

It is another object of the invention to provide such a fastener which permits esthetic design freedom of the exposed button head as well as permitting inexpensive attachment to material.

It is a further object of the invention to provide such a fastener which is easily removed and reattached to permit the cleaning and pressing of the garment to which the fastener is attached.

Briefly, the invention contemplates a fastener comprising a pin member and a socket member for accepting the pin member. The pin member has a base and a post integrally extending from the base. The post has a shank section of square cross section adjacent the base and a head section with a pair of opposed laterally extending projections. The socket member which is of resilient material has a base and a slotted sleeve integrally extending from the base. Within the sleeve and the base is a communicating passageway which is divided into first and second axially displaced sections. The first section is remote from the base and has a cross section for accepting the passage of the head section of the pin member only when in a particular relative rotational position. In addition, the first section has at least one dimension which is greater than the length of a side but less than a diagonal of the square cross section of the pin member. The second section of the passageway is partially within the base and has a substantially cylindrical form for receiving the head section so that the shank section of the pin member can be in the first section of the socket member whereby a relative rotation of the members by a first amount resiliently spreads the sleeve so as to elastically bias the continuance of the rotation in the same direction until the projections are forced against stop surfaces within the second section of the passageway through the socket member.

When the threadless fastener of the invention is considered as a replacement for a conventional button, many advantages are obtained. Such fasteners are readily removable and interchangeable. Thus, the fasteners can be easily removed when the garment is being cleaned. Accidentally lost fasteners are easily replaced since the annoying ordeal of sewing is eliminated. Different colors and styles of buttons can be used with the same garment merely by snapping in and out different face elements. By utilizing a backing element tearing due to stresses on the material is minimized. Furthermore, no dangling of threads is possible and a neat closure is presented.

Other objects, features and advantages of the invention will be apparent from the following detailed description of the invention when read with the accompanying drawing which shows by way of example and not by limitation, the presently preferred embodiment of the invention.

In the drawing:

FIG. 1 is an elevation view of a locked fastener attached to a garment in accordance with the invention;

FIG. 2 is an elevation view of the pin part of the fastener of FIG. 1;

FIG. 3 is a bottom view thereof;

FIG. 4 is an elevation view of the socket part of the fastener of FIG. 1;

FIG. 5 is a bottom view thereof;

FIG. 6 is a top view thereof;

FIG. 7 is a plan section view of the fastener at the 45° position of the locking operation, the section taken at the base of the pin and top of the socket in FIG. 1;

FIG. 8 is a bottom view of FIG. 1 showing, in arrows, the mutual turning operation for locking; and FIG. 9 is a view of a garment-piercing tool that fits on the socket so that the insertion of this part follows the piercing operation. The tool is then removed from the front of the garment.

In FIGS. 1 through 6 in particular, a fastener 10 is shown comprising a pin member 12 and a socket member 14, preferably molded of tough but slightly flexible plastic.

Pin 12 (FIG. 2) has a base 16 extending to a post 18. Post 18 is divided into three formed sections: a square section 20 adjacent base 16; a cylinder section 22; and a head 24 having a pair of opposed laterally extending projections 26. Projections 26 are chamfered at the outer surface as seen at 28, and at the inner surface at 30. Finally, as best seen in FIG. 3, projections 26 each are provided with a rotatably-actuated stop-surface 32.

Socket 14 (FIG. 4) has a base 40 from which axially extends sleeve 42 which is provided with a contoured passageway 44. Passageway 44 is formed in three sections: a distorted octagonal section 46 having a pair of cam surfaces 48, a frusto-conical section 50 and a cylinder section 52 that is interrupted by two inwardly and oppositely disposed stopsurfaces 54 (FIG. 6). Finally, sleeve 42 has a tapering chamfer 56 and is slotted as at 58 (FIG. 4).

The joining or separation, at will, of parts 12 and 14 is as follows:

A comparison of the cross-section of portion 24 in FIG. 3 and of the opening 46 in FIG. 6 shows that post 18 will pass completely through the opening 46. Referring now in particular to FIGS. 7 and 8, if pin 12 and/or socket 14 are turned clockwise with respect to each other, it will be observed that two things take place. Square section 20 cams on surfaces 48 thereby forcibly springing sleeve 42 apart. Simultaneously, section 24 turns in the space formed by conical section 50 and cylinder section 52. Beyond the 45° of turn as shown in FIG. 7, elasticity of sleeve 42 takes over and projections 26 ride completely in to the self-locking position at 90° (FIG. 8) wherein surfaces 32 are against surfaces 54.

It should be noted that in this position the parts are secured against rotational and axial movement. Further, the parts are readily separable manually by light-force applied counter-clockwise operation.

By way of example, an application of the fastener is shown in FIG. 1 applied to a garment button. Part 16 is fixed to a button 60 or the like by cementing or the like, as shown at 62. The button 60 is not only quickly and securely attached, but also lends itself to quick removal as sometimes required in cleaning and/or pressing and in simple exchange for costume variety reasons.

In order to simplify the garment-piercing operation, a tool 70 is shown in FIG. 9 intended for use with the fastener and, therefore, can be included in the merchandising kit unit. The tool is molded to have a tapered and pointed piercing section 72, a stem 74 that fits into opening 46 of socket 14 and a recess 76 matching the socket chamfer 56. Assembled as seen in the Figure, the garment is readily pierced to smoothly receive the socket. Tool 70 is then removed for repeated use or discarded. The tool is useful not only for heavy garment materials but even in light or thin material to prevent entry of fibers into opening 58.

While the fastener has been described with respect to a conventional garment button it can have many other uses such as cuff links, fasteners for insignia and the like on military uniforms and fasteners for jewelry and other fashion accessories.

While only one embodiment of the invention has been shown and described in detail, there will now be obvious to those skilled in the art, many modifications and variations satisfying many or all of the objects of the invention but which do not depart from the spirit of the invention as defined by the appended claims.

What is claimed is:

1. A fastener comprising: a pin member, said pin member having a base and a post integrally extending from said base, said post having at least a shank section of square cross-section adjacent said base and having a head section, said head section having a pair of opposed laterally extending projections, said projections being chamfered; and a socket member of resilient material, said socket member having a base and a sleeve integrally extending from said base, said sleeve being slotted and said sleeve and said base having a communicating passageway divided into first, second and third axially displaced sections, said first section being remote from said base and having a cross section for accepting the passage of the head section of said pin member only when in a particular relative rotational position, said first section having at least one dimension greater than the length of a side but less than a diagonal of the square cross section of said shank section of said pin member, said second section being frusto-conical, said third section being within said base and having a substantially cylindrical form for receiving said head section so that the shank section of said pin member will be in the first section of said socket member and stop surfaces within said third section, whereby a relative rotation of said members by a first amount while said projections ride over the frusto-conical surface of said second section results in a resilient spread of said sleeve so that any further rotation in the same direction is biased to continue until said stop surfaces in said third section of said socket member abut against the lateral projections of said pin member to lock the two members together.

2. The fastener of claim 1 wherein said pin member has a third section between said head section and said shank section, said third section having a circular cross section with a diameter equal to the length of a side of said shank section.

3. The fastener of claim 1 further comprising a button head with a cavity in the rear face thereof, the base of said pin member being fixed in said cavity.

4. The fastener of claim 1 wherein said pin member has a third section between said head section and said shank section, said third section having a circular cross section with a diameter equal to the length of a side of said shank section.

5. The fastener of claim 4 further comprising a button head with a cavity in the rear face thereof, the base of said pin member being fixed in said cavity.

* * * * *